(12) United States Patent
Onizuka et al.

(10) Patent No.: US 11,898,305 B2
(45) Date of Patent: Feb. 13, 2024

(54) COMPOSITE MATERIAL, AND PREPREG USING SAME

(71) Applicant: NITTA CORPORATION, Osaka (JP)

(72) Inventors: Maki Onizuka, Osaka (JP); Takuji Komukai, Osaka (JP); Daiki Ishii, Osaka (JP); Jun Inoi, Osaka (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 17/962,615

(22) Filed: Oct. 10, 2022

(65) Prior Publication Data

US 2023/0045012 A1 Feb. 9, 2023

Related U.S. Application Data

(63) Continuation of application No. 16/485,480, filed as application No. PCT/JP2018/004429 on Feb. 8, 2018, now abandoned.

(30) Foreign Application Priority Data

Feb. 13, 2017 (JP) ................................ 2017-024507

(51) Int. Cl.
*D06M 11/74* (2006.01)
*C08J 5/24* (2006.01)
(Continued)

(52) U.S. Cl.
CPC .............. *D06M 11/74* (2013.01); *C08J 5/248* (2021.05); *D06M 23/10* (2013.01);
(Continued)

(58) Field of Classification Search
CPC .. D06M 23/10; D06M 2101/40; D06M 11/74; D06B 23/023; B82Y 40/00
See application file for complete search history.

(56) References Cited

U.S. PATENT DOCUMENTS

| 2011/0001086 A1* | 1/2011 | Kruckenberg | ........ D06M 23/08 977/734 |
| 2019/0358930 A1* | 11/2019 | Onizuka | ................... B32B 5/12 |

FOREIGN PATENT DOCUMENTS

| EP | 2653493 A1 | 10/2013 |
| JP | 2003-239171 A | 8/2003 |

(Continued)

OTHER PUBLICATIONS

Extended European Search Report issued in the counterpart European Patent Application No. 18751523.4, dated Nov. 20, 2020 (6 pages).

*Primary Examiner* — Kregg T Brooks
(74) *Attorney, Agent, or Firm* — Osha Bergman Watanabe & Burton LLP (57) ABSTRACT

A method for producing a composite material, includes: immersing a carbon fiber bundle, including continuous carbon fibers, in a dispersion in which carbon nanotubes are dispersed in water, alcohol, or organic solvent; applying a tensile force to the carbon fibers, which are linearly arranged, using flat rollers; moving the carbon fibers linearly, under the tensile force by the flat rollers, at a constant depth inside the dispersion at a traveling speed of 1 to 20 m/min, such that the carbon nanotubes in the dispersion are adhered to respective surfaces of the carbon fibers; and applying a sizing agent to cover at least a part of the respective surfaces.

2 Claims, 5 Drawing Sheets

(51) Int. Cl.
*D06M 23/10* (2006.01)
*D06M 101/40* (2006.01)

(52) U.S. Cl.
CPC ........ *C08J 2361/12* (2013.01); *C08J 2363/00* (2013.01); *C08J 2377/06* (2013.01); *D06M 2101/40* (2013.01)

(56) References Cited

FOREIGN PATENT DOCUMENTS

| | | | |
|---|---|---|---|
| JP | 2006274211 A | * | 10/2006 |
| JP | 2009-535530 A | | 10/2009 |
| JP | 2013-076198 A | | 4/2013 |
| WO | 2013/184285 A1 | | 12/2013 |
| WO | 2016/063809 A1 | | 4/2016 |
| WO | 2016/159121 A1 | | 10/2016 |
| WO | 2016/159122 A1 | | 10/2016 |

* cited by examiner

COMPOSITE MATERIAL, AND PREPREG USING SAME

TECHNICAL FIELD

The present invention relates to a composite material in which carbon nanotubes (hereinafter referred to as CNT) adhere to the surfaces of a plurality of continuous carbon fibers constituting a carbon fiber bundle; and to a prepreg using the same.

BACKGROUND ART

Fiber-reinforced molded articles in which reinforcing fibers are dispersed in a resin that is a base material are excellent in mechanical properties and dimensional stability, and accordingly are used in a wide range of fields. A CNT/carbon fiber composite material having a structure in which a plurality of CNTs are entangled on the surface of a carbon fiber to form a thin film of a network of CNTs has been proposed as a reinforcing fiber (for example, Patent Literature 1).

A carbon fiber bundle in which continuous carbon fibers in units of thousands to tens of thousands are bundled has excellent properties such as low density, high specific strength and high specific elastic modulus. A prepreg obtained by impregnating such a carbon fiber bundle with a resin is expected to be applied to applications to which stricter performances are required (aerospace-related applications, and the like).

CITATION LIST

Patent Literature

Patent Literature 1: Japanese Patent Laid-Open No. 2013-76198

SUMMARY OF INVENTION

Technical Problem

In Patent Literature 1, carbon fibers are immersed in a dispersion containing CNTs, and energy such as vibration, light irradiation and heat is applied to form a network of CNTs on the surfaces of carbon fibers. It is described that when the composite material of Patent Literature 1 is impregnated with a base material, a fiber-reinforced molded article can be obtained in which the base material and the carbon fiber firmly bond to each other while taking advantage of the properties of the base material.

When CNTs adhere to the surface of each carbon fiber, in a carbon fiber bundle containing a plurality of continuous carbon fibers, a more superior reinforcing fiber (composite material) can be obtained which has also properties derived from the CNTs combined to those of the carbon fiber. For example, in order to produce a prepreg of which the longitudinal strength of the carbon fiber has been further enhanced, a composite material having a higher longitudinal strength is required.

Thus, an object of this invention is to provide a composite material that can exhibit a higher strength based on properties of a carbon fiber bundle, and properties derived from CNTs; and a prepreg using the same.

Solution to Problem

A composite material according to the present invention is a composite material that includes: a carbon fiber bundle in which a plurality of continuous carbon fibers are arranged; carbon nanotubes which adhere to respective surfaces of the carbon fibers; and a sizing agent which covers at least a part of each of the surfaces to which the carbon nanotubes adhere, wherein when the composite material disposed such that a longitudinal direction is vertically oriented is pierced with an inspection needle having a diameter of 0.55 mm across the longitudinal direction, and the composite material and the inspection needle are relatively moved in the longitudinal direction by 40 mm at a speed of 300 mm/min, the maximum value of a load acting between the composite material and the inspection needle is smaller than 0.5 N.

The prepreg according to the present invention includes the composite material, and a matrix resin impregnated in the composite material.

Advantageous Effects of Invention

In the composite material of the present invention, the load which the composite material receives in the longitudinal direction under predetermined conditions is defined to be smaller than a predetermined value, and accordingly the entanglement of carbon fibers contained in the carbon fiber bundle with each other does not substantially exist. Each of the carbon fibers in the carbon fiber bundle can contribute to the strength, and the original strength of the carbon fiber bundle is exhibited.

Moreover, in the composite material of the present invention, CNTs adhere to the respective surfaces of the carbon fibers contained in the carbon fiber bundle. Thereby, the composite material of the present invention can exhibit higher strength. By using the composite material of the present invention, a prepreg having the higher strength can be produced.

DESCRIPTION OF EMBODIMENTS

Embodiments of the present invention will be described below in detail with reference to the drawings.

1. Whole Structure

Figure 1:
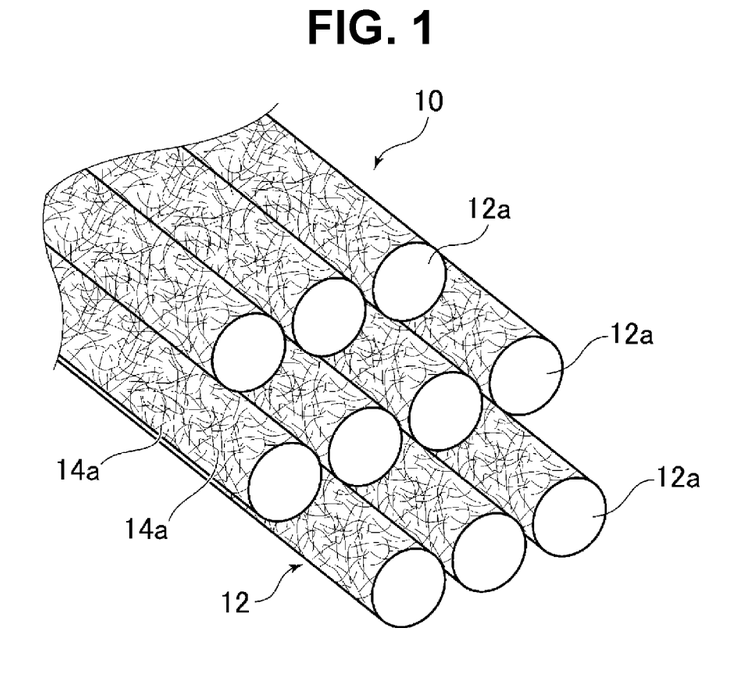
FIG. 1 is a partial schematic view showing a structure of a composite material according to the present embodiment.

As is shown in FIG. 1, a composite material 10 of the present embodiment includes a carbon fiber bundle 12 in which a plurality of continuous carbon fibers 12a are arranged. The carbon fibers 12a each has a diameter of approximately 5 to 20 μm and is obtained by baking of organic fibers derived from fossil fuels, or organic fibers derived from wood or plant fibers.

In the figure, only ten pieces of carbon fibers 12a are shown for the purpose of description, but the carbon fiber bundle 12 in the present embodiment can contain one thousand to one hundred thousand carbon fibers 12a. The carbon fibers 12a constituting the carbon fiber bundle 12 maintain linearity substantially without being entangled with each other. The composite material 10 of the present embodiment including such carbon fibers 12a is in a shape of a strip in which 3 to 30 carbon fibers 12a are piled in a thickness direction.

The CNTs 14a adhere to a surface of each of the carbon fibers 12a. The CNTs 14a are uniformly dispersed and entangled across substantially the entire surface of the carbon fibers 12a, being in direct contact with or directly connected to one another to form a network structure. It is preferable that a dispersing agent such as a surfactant or an intervening material such as an adhesive does not exist between the CNTs 14a. In addition, the CNTs 14a directly adhere to the surfaces of the carbon fibers 12a. The connection referred here includes physical connection (simple contact). In addition, the adhesion referred here refers to bonding by the van der Waals forces. Furthermore, "direct contact or direct connection" includes a state in which the plurality of CNTs are integrally connected with each other, in addition to a state in which the plurality of CNTs simply come in contact with each other.

It is preferable that a length of the CNT 14a is 0.1 to 50 μm. When the length of the CNT 14a is 0.1 μm or longer, the CNTs 14a are entangled with and are directly connected to each other. In addition, when the length of CNT 14a is 50 μm or shorter, the CNTs 14a are likely to be uniformly dispersed. On the other hand, when the length of the CNT 14a is shorter than 0.1 μm, the CNTs 14a resist being entangled with each other. In addition, when the length of the CNT 14a exceeds 50 μm, the CNTs 14a are likely to aggregate.

It is preferable that an average diameter of the CNTs 14a is approximately 30 nm or smaller. When the diameter of the CNT 14a is 30 nm or smaller, the CNT 14a becomes rich in flexibility, and can form a network structure on the surface of each of the carbon fibers 12a. On the other hand, when the diameter of the CNT 14a exceeds 30 nm, the flexibility is lost, and it becomes difficult to form the network structure on the surface of each of the carbon fibers 12a. Incidentally, the diameter of CNT 14a shall be an average diameter which has been measured with the use of a photograph by a transmission electron microscope (TEM: Transmission Electron Microscope). It is more preferable that the average diameter of CNT 14a is approximately 20 nm or smaller.

It is preferable that the plurality of CNTs 14a uniformly adhere to the respective surfaces of the carbon fibers 12a in the carbon fiber bundle 12. A state of the CNT 14a adhering to the surface of the carbon fiber 12a can be observed by a scanning electron microscope (SEM: Scanning Electron Microscope), and the obtained image can be visually evaluated.

Furthermore, at least a part of the surface of the carbon fiber 12a to which the plurality of CNTs 14a adhere is covered with a resin referred to as a sizing agent. As the sizing agent, a urethane emulsion and an epoxy emulsion are generally used.

As has been described above, the carbon fibers 12a contained in the carbon fiber bundle 12 maintain linearity without substantially being entangled with each other. The entanglement of the carbon fibers 12a in the carbon fiber bundle 12 can be evaluated by the linearity of adjacent carbon fibers 12a.

Figure 2:
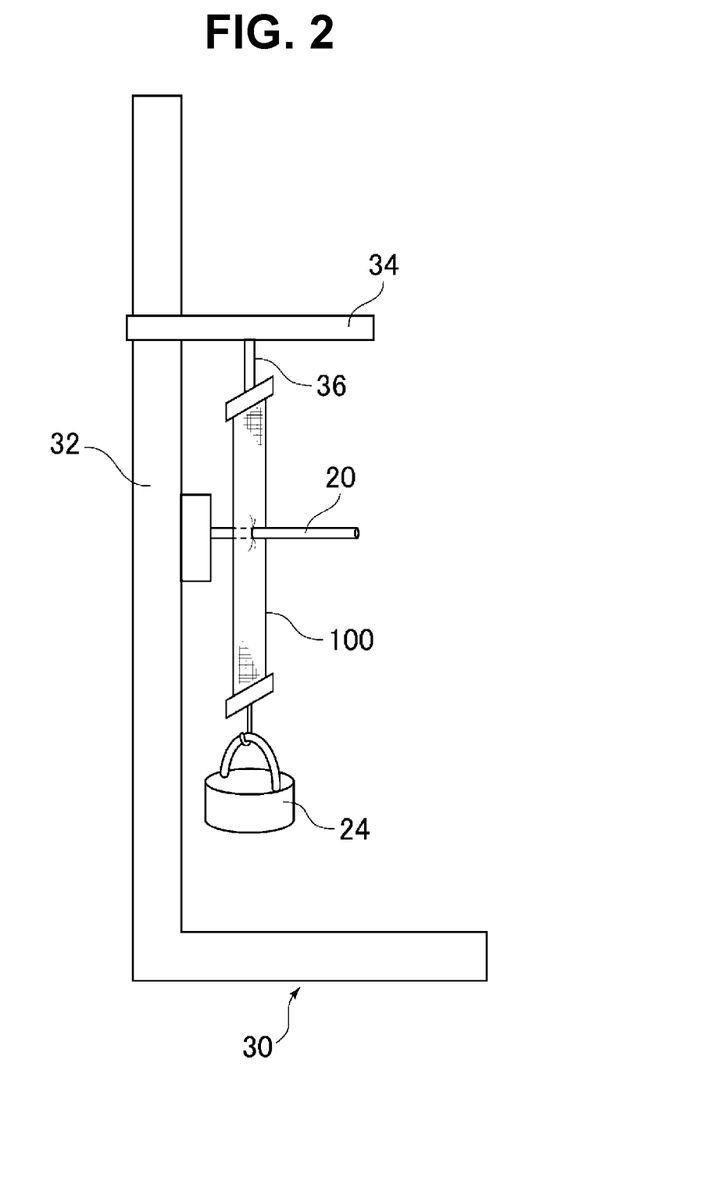
FIG. 2 is a schematic view for describing a method of evaluating entanglement of carbon fibers in a composite material.

A method of evaluating the linearity of the adjacent carbon fibers 12a will be described below with reference to FIG. 2. For the evaluation, a support stand 30 can be used on which a transverse bar portion 34 that can move up and down is provided on a standing portion 32. The composite material 10 is cut into a predetermined length (for example, approximately 150 to 300 mm), and a sample 100 for measurement is prepared.

The sample 100 for measurement is set such that the longitudinal direction is vertically oriented, and one end thereof is attached to the transverse bar portion 34 via a connecting member 36. A weight 24 having an appropriate weight is connected to the other end of the sample 100 for measurement such that the sample 100 for measurement is taut. The weight of the weight 24 is selected such that the original length of the sample 100 for measurement is maintained. By the use of the weight 24 having the appropriate weight, the sample 100 for measurement can be stably suspended from the transverse bar portion 34 of the support stand 30.

The standing portion 32 of the support stand 30 is provided with an inspection needle 20 (diameter of 0.55 mm) extending in a horizontal direction. The sample 100 for measurement is pierced with the inspection needle 20 across the longitudinal direction of the sample, the transverse bar portion 34 is moved upward, and thereby the sample 100 for measurement and the inspection needle 20 are relatively moved. The moving speed is set at 300 mm/min, and the moving distance is set at 40 mm.

A not-shown load cell is connected to the inspection needle 20. When the sample 100 for measurement and the inspection needle 20 are relatively moved, the load acting between the sample and the needle is measured by the load cell. The smaller is the measured load, the more excellent is the linearity of the carbon fibers 12a (see FIG. 1) in the carbon fiber bundle 12. In other words, the carbon fibers 12a contained in the carbon fiber bundle 12 cause less entanglement with each other.

In the composite material 10 of the present embodiment, when the composite material has been relatively moved to the inspection needle 20 under predetermined conditions, the maximum value of the load acting between the composite material 10 and the inspection needle 20 is smaller than 0.5 N, and accordingly the plurality of continuous carbon fibers 12a are arranged so as to keep linearity substantially without being entangled.

It is preferable that the average value of the load acting between the composite material 10 and the inspection needle 20 is smaller than 0.4 N. The average value of the acting load is calculated, after the loads at 810 points have been measured while the composite material 10 and the inspection needle 20 are relatively moved to each other by 40 mm, as an average of the load of the 810 points.

2. Production Method

Next, a method for producing the composite material 10 according to the present embodiment will be described. The composite material 10 can be produced by steps of immersing the carbon fiber bundle 12 containing the plurality of carbon fibers 12a in a CNT dispersion (hereinafter, also simply referred to as dispersion) in which the CNTs 14a are isolated from one another and are dispersed, and making the carbon fiber bundle travel therein to make the CNT 14a adhere to the respective surfaces of the carbon fibers 12a. Each of the steps will be sequentially described below.

(Preparation of Dispersion)

For the preparation of the dispersion, the CNT 14a can be used which has been produced in the following way. The CNT 14a can be produced by steps of: forming a film of a catalyst which is formed from aluminum and iron, on a silicon substrate with the use of a thermal CVD method as described in Japanese Patent Laid-Open No. 2007-126311, for example; converting the catalyst metal into fine particles for growth of the CNT; and bringing a hydrocarbon gas into contact with the catalyst metal in a heating atmosphere.

A CNT may be used which has been produced by other methods such as an arc discharge method and a laser evaporation method, as long as the CNT contains impurities as little as possible. The impurities can be removed by a step of annealing the produced CNT at a high temperature in an inert gas. The thus produced CNT has such a high aspect ratio and linearity that the diameter is 30 nm or smaller and the length is several hundred micrometers to several millimeters. The CNTs may be any of a single layer and multiple layers, but are preferably multiple layers.

Using the CNTs 14a which have been produced as in the above described way, a dispersion, in which the CNTs 14a are isolated-dispersed, is prepared. The term isolated-dispersed means a state in which CNTs 14a are dispersed in a dispersion medium so that the CNTs 14a are each physically separated and not entangled with one another, and also in which the percentage of aggregates in which two or more CNTs 14a are aggregated in a bundle form is 10% or less.

The dispersion is treated by a homogenizer, shear force, an ultrasonic disperser or the like, and thereby the CNTs 14a are uniformly dispersed. Usable dispersion medium include: water; alcohols such as ethanol, methanol and isopropyl alcohol; and organic solvents such as toluene, acetone, tetrahydrofuran (THF), methyl ethyl ketone (MEK), hexane, normal hexane, ethyl ether, xylene, methyl acetate and ethyl acetate, etc.

Additives such as a dispersing agent and a surfactant are not necessarily required for the preparation of the dispersion, but the above additives may be used only in such a range as not to hinder the functions of the carbon fibers 12a and the CNTs 14a.

(Adhesion of CNT)

The CNTs 14a are made to adhere to the surfaces of the carbon fibers 12a by the steps of: immersing the carbon fiber bundle 12 in the dispersion which has been prepared in the above described way; making the carbon fiber bundle 12 travel therein under predetermined conditions; and applying mechanical energy to the dispersion.

The step of making the CNTs 14a adhere to the carbon fibers 12a will be described below with reference to FIG. 3. In a CNT adhesion tank 40 in which the dispersion 46 is accommodated, a plurality of guide rollers 42 for making the carbon fiber bundle 12 travel in the direction of the arrow A are disposed. The guide rollers 42 are flat rollers of which the diameter D is 50 mm and the length L is 100 mm, as are shown in the side view of FIG. 4.

Figure 4:
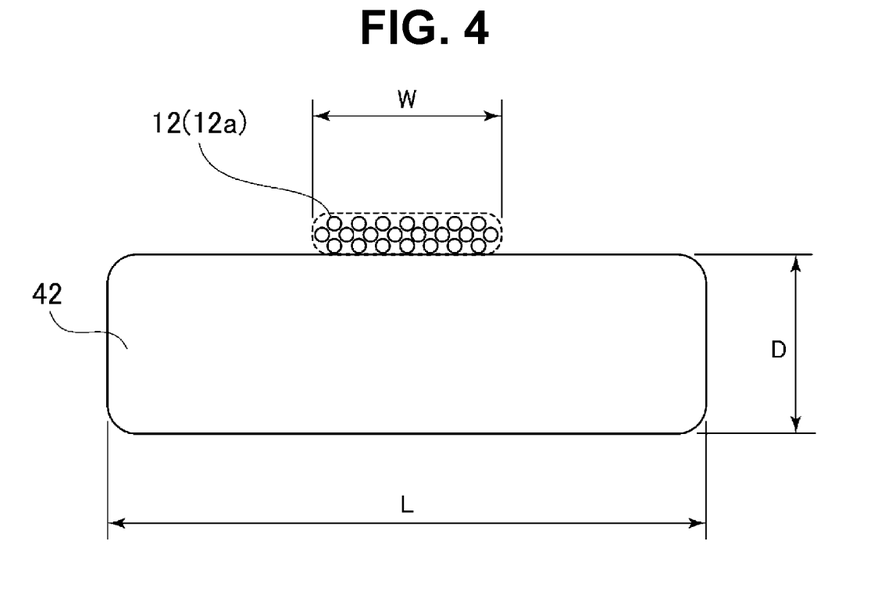
FIG. 4 is a side view for describing a guide roller.

In the carbon fiber bundle 12, carbon fibers 12a of the order of 3 to 30 fibers are piled in the thickness direction. A length L of the guide roller 42 is sufficiently larger than a width w of the carbon fiber bundle 12. It is preferable that the carbon fiber bundle 12 is wound around the guide roller 42 at a smaller winding angle (90° or smaller). It is preferable that the guide roller 42 is disposed such as to make the carbon fiber bundle 12 linearly travel.

The carbon fiber bundle 12 is reliably supported by the guide roller 42, and can travel in the dispersion 46 without causing contraction. The carbon fibers 12a contained in the carbon fiber bundle 12 undergo a tensile force in a state of having been supported by the guide roller 42, thereby the entanglement is reduced, and the linearity is enhanced.

Figure 3:
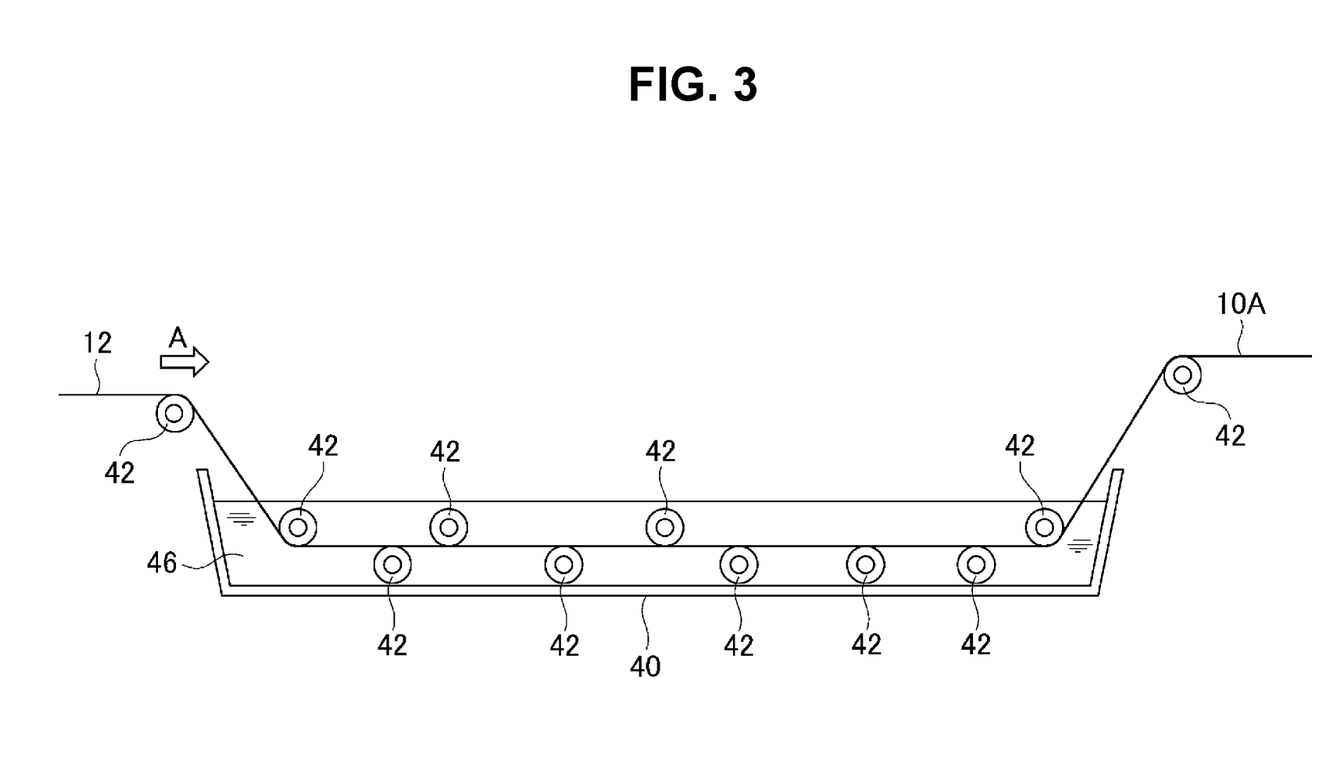
FIG. 3 is a schematic view for describing a CNT adhesion process.

As is shown in FIG. 3, due to the plurality of guide rollers 42, the carbon fiber bundle 12 travels in a certainly deep place within the CNT adhesion tank 40 at a traveling speed, without undergoing an excessive load. The carbon fiber bundle 12 is not bent during traveling, and accordingly such a possibility is reduced that the carbon fibers 12a contained in the carbon fiber bundle 12 are entangled with each other. It is preferable that the traveling speed of the carbon fiber bundle 12 is set at a level of 1 to 20 m/min. As the traveling speed is slower, the linearity of the carbon fibers 12a in the carbon fiber bundle 12 can be enhanced.

Mechanical energy such as vibration, ultrasonic waves and rocking is given to the dispersion 46. Thereby, in the dispersion 46, a reversible reaction condition in which a dispersion state of the CNTs and an aggregation are constantly generated, is created.

When the carbon fiber bundle 12 containing the plurality of continuous carbon fibers 12a is immersed in the dispersion in the reversible reaction state, the reversible reaction state of the dispersion state and the aggregation state of the CNTs 14a occurs also on the surfaces of the carbon fibers 12a. The CNTs 14a adhere to the surfaces of the carbon fibers 12a, when moving from the dispersion state to the aggregation state.

At the time when the CNTs aggregate, a van der Waals force acts on the CNTs 14a, and the CNTs 14a adhere to the surfaces of the carbon fibers 12a due to the van der Waals force. Thus, such a carbon fiber bundle 12 is obtained that the CNTs 14a have adhered to the respective surfaces of the carbon fibers 12a in the carbon fiber bundle 12.

After that, the carbon fiber bundle is subjected to sizing treatment and drying, and the composite material 10 of the present embodiment is produced. The sizing treatment can be performed by a general method with the use of a general sizing agent. The carbon fiber bundle after the sizing treatment is placed on a hot plate, for example, and the drying can be achieved.

(Production of Prepreg)

The composite material 10 of the present embodiment can be impregnated with a matrix resin to form a prepreg. The matrix resin is not limited in particular, but includes thermosetting resins such as an epoxy resin, and thermoplastic resins such as a phenoxy resin and nylon.

As has been described above, in the composite material 10 according to the present embodiment, the entanglement of the carbon fibers 12a in the carbon fiber bundle 12 with each other do not substantially exist, and accordingly in the prepreg as well, the carbon fibers 12a are not entangled with each other. Moreover, the CNTs 14a adequately adhere to the respective surfaces of the carbon fibers 12a in the carbon fiber bundle 12.

For the prepreg in which such a composite material 10 is impregnated with the resin, such a possibility is very low that the strength is reduced due to the entanglement of the carbon fibers 12a with each other, and accordingly the properties of the carbon fiber bundle 12 are sufficiently exhibited. In addition to the properties, the obtained prepreg can fully exhibit also the properties derived from the CNTs, because the CNTs 14a adequately adhere to the surface of each of the carbon fibers 12a.

3. Action and Effect

As for the composite material 10 according to the present embodiment, when the composite material 10 is pierced through with the inspection needle 20 having a diameter of 0.55 mm and is relatively moved to the inspection needle 20 in the longitudinal direction, the maximum value of the load which acts between the composite material 10 and the inspection needle 20 is smaller than 0.5 N, and accordingly the linearity of the adjacent carbon fibers 12a contained in the carbon fiber bundle 12 is excellent. The carbon fibers 12a keep the linearity without substantially being entangled with each other. The carbon fibers 12a which are arranged while keeping the linearity can contribute to the enhancement of the strength of the composite material 10.

Moreover, the CNTs 14a adhere to the respective surfaces of the carbon fibers 12a, and at least a part of the surfaces to which the CNTs 14a adhere is covered with the resin.

The composite material 10 of the present embodiment can exhibit a higher strength based on the properties derived from the CNTs and the properties of the carbon fiber bundle, because the carbon fiber 12a to the surface of which the CNTs have adhered keeps the linearity. By using such a composite material 10 of the present embodiment, a prepreg of higher strength can be produced.

4. Example

The present invention will be described below in detail with reference to Examples, but the present invention is not limited to the following Examples.

The composite material of Example 1 was produced according to a procedure shown in the above described production method. As the CNTs 14a, MW-CNTs (Multi-walled Carbon Nanotubes) were used which were grown to a diameter of 10 to 15 nm and a length of 100 μm or longer on a silicon substrate by a thermal CVD.

The CNTs 14a were washed with the use of a mixed acid of which the ratio of sulfuric acid to nitric acid was 3:1, thereby the catalyst residue was removed, and then the resultant CNTs 14a were filtered and dried. The CNTs 14a were added to MEK of a dispersion medium, and a dispersion was prepared. The CNTs 14a were crushed with the use of an ultrasonic homogenizer, and were cut into lengths of 0.5 to 10 μm. The concentration of the CNTs 14a in the dispersion was controlled to be 0.01 wt %. This dispersion does not contain a dispersing agent or an adhesive.

The CNT adhesion tank 40 as shown in FIG. 3 was prepared, and the thus prepared dispersion 46 was accommodated therein. In the CNT adhesion tank 40, guide rollers 42 (with diameter of 50 mm and length of 100 mm) as described with reference to FIG. 4 are provided. To the dispersion 46, vibration, ultrasonic waves or rocking were given which were mechanical energy.

As the carbon fiber bundle 12, T700SC-12000 (made by Toray Industries, Inc.) was used. The carbon fiber bundle 12 contains 12000 carbon fibers 12a. A diameter of the carbon fiber 12a is approximately 7 μm, and a length thereof is approximately 100 m. The carbon fiber bundle 12 was immersed in the dispersion 46, and was made to travel at a speed of 3.5 m/min via the guide rollers 42.

After that, the resultant carbon fiber bundle 12 was subjected to sizing treatment which uses an epoxy resin as a sizing agent, and then was dried on a hot plate at approximately 80° C. In this way, the composite material 10 of Example 1 was produced. The composite material 10 of Example 1 had a shape of a strip in which 12 carbon fibers were piled in the thickness direction.

A composite material 10 of Example 2 was produced in a similar way to that in Example 1, except that the traveling speed of the carbon fiber bundle 12 was changed to 5 m/min. The composite material 10 of Example 2 had the shape of the strip in which 12 carbon fibers were piled in the thickness direction.

Figure 5:
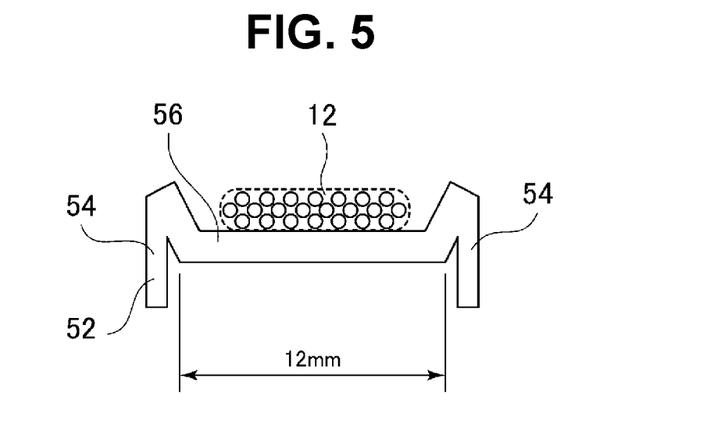
FIG. 5 is a partial side view for describing a flange roller.

Furthermore, a composite material of Comparative Example was produced with the use of a conventional CNT adhesion tank provided with a flange roller, at the traveling speed of the carbon fiber bundle, which was changed to 3 m/min. A part of the side face of the flange roller is shown in FIG. 5. The flange roller 52 has flange portions 54 on the circumference of the side face, and supports the carbon fiber bundle 12 on a region 56 in between the flange portions 54. In the flange roller 52, the width of the region 56 which supports the carbon fiber bundle 12 thereon is 12 mm. The composite material of the Comparative Example had the shape of the strip in which 17 carbon fibers were piled in the thickness direction.

It was confirmed by SEM observation that in each of the composite materials of Examples 1 and 2 and Comparative Example, a plurality of CNTs adhered to the surfaces of the carbon fibers contained in the carbon fiber bundle, in a form of being uniformly dispersed.

<Evaluation of Entanglement of Carbon Fibers>

The entanglement of the carbon fibers contained in the carbon fiber bundle was evaluated on the composite materials of Example 1 and 2 and the Comparative Example. The evaluation was performed by an operation of examining the linearity of adjacent carbon fibers according to the method as described with reference to FIG. 2.

The composite material of Example 1 was cut into a length of 150 mm, and a sample 100 for measurement was prepared. One end of the sample 100 for measurement was fixed to the transverse bar portion 34 of the support stand 30, and the weight 24 of 20 g was connected to the other end. The sample 100 for measurement was pierced with the inspection needle 20 (diameter of 0.55 mm) which was provided so as to extend from the standing portion 32 of the support stand 30, across the longitudinal direction of the sample.

Figure 6:
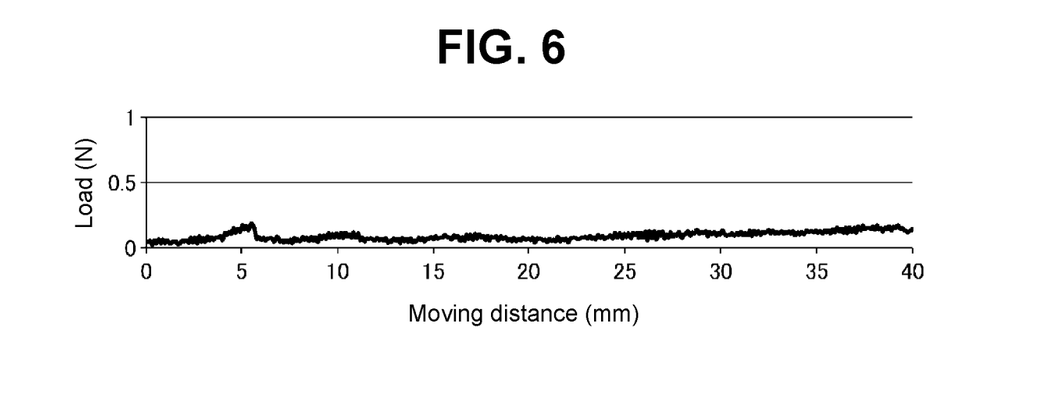
FIG. 6 is a graph showing a load acting between a composite material of Example 1 and an inspection needle.
Figure 7:
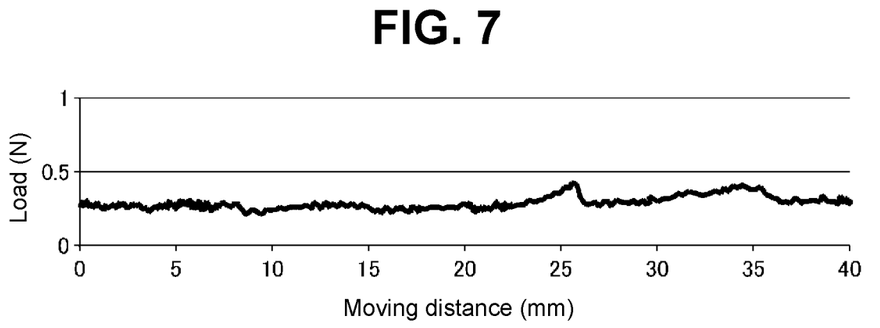
FIG. 7 is a graph showing a load acting between a composite material of Example 2 and the inspection needle.
Figure 8:
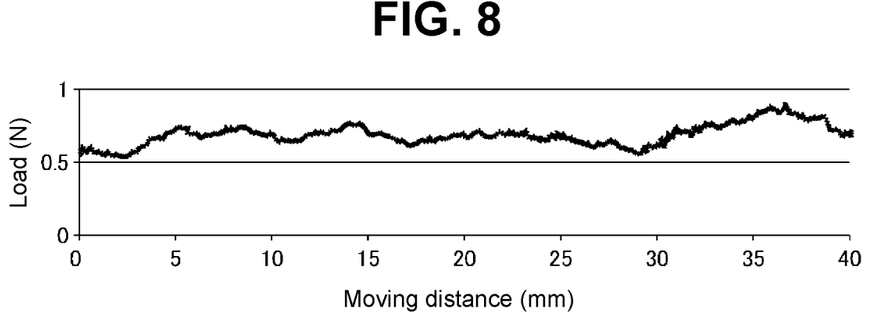
FIG. 8 is a graph showing a load acting between a composite material of a comparative example and the inspection needle.

While the load acting between the sample 100 for measurement and the inspection needle 20 was measured with a not-shown load cell, the transverse bar portion 34 which suspended the sample 100 for measurement was raised by 40 mm at a speed of 300 mm/min. Changes of the measured load are shown in the graph of FIG. 6. In FIG. 6, the horizontal axis is a movement distance (mm) of the transverse bar portion 34 which has moved upward. The loads of the composite material of Example 2 and the composite material of Comparative Example were also measured by a similar method. The results are shown in FIGS. 7 and 8, respectively.

Furthermore, the maximum value, the minimum value and the average value of the measured loads of Examples 1 and 2 and Comparative Example are summarized in the following Table 1. The average value was determined as an average of loads at 810 points at which the loads were measured while the transverse bar portion 34 was raised by 40 mm.

TABLE 1

|  | Example 1 | Example 2 | Comparative Example |
|---|---|---|---|
| Maximum value | 0.172 | 0.425 | 0.906 |
| Minimum value | 0.00286 | 0.211 | 0.531 |
| Average value | 0.0764 | 0.287 | 0.689 |

In the composite materials of Examples 1 and 2, the maximum values of the loads are 0.172 N and 0.425 N, respectively, which are smaller than 0.5 N. In the composite materials of Examples 1 and 2, average values of the loads are 0.0764 N and 0.287 N, respectively, which are smaller than 0.4 N. In contrast to this, in the composite material of the Comparative Example, the maximum value of the load is 0.908 N. In the case of the Comparative Example, even the minimum value of the load is 0.531 N which exceeds 0.5 N, and an average value of the load reaches even 0.689 N.

A magnitude of the load is an index which indicates a degree of the entanglement of the carbon fibers contained in the carbon fiber bundle. The smaller is the load, the more excellent is the linearity of the adjacent carbon fibers, which means accordingly that the entanglement of the carbon fibers with each other is reduced.

The composite material of the Examples and the composite material of the Comparative Example are produced under similar conditions, except that the CNT adhesion step such as the roller and the winding angle is different. In the Examples, the CNT adhesion tank provided with the flat roller was used, and in the Comparative Example, the conventional CNT adhesion tank provided with the flange roller was used. From the results of the Examples and the Comparative Example, it can be understood that the entanglement of the carbon fibers with each other can be greatly reduced by the use of the CNT adhesion tank provided with the flat roller. The slower the moving speed of the carbon fiber bundle is, the more highly the effect is enhanced.

In the composite material of the Example, the entanglement of the carbon fibers in the carbon fiber bundle with each other does not substantially exist, and the carbon fibers are arranged while keeping the linearity. Moreover, the plurality of CNTs adhere to the surface of the carbon fibers in a form of being uniformly dispersed. Accordingly, the composite material of the Examples can exhibit a higher strength based on the properties of the carbon fiber bundle and the properties derived from the CNTs. By using the composite material of the Example, a prepreg having a higher strength can be obtained.

In the composite material of the Comparative Example, the entanglement of the carbon fibers with each other occurs even though the plurality of CNTs adhere to the surface of the carbon fibers in a form of being uniformly dispersed. It is assumed that in the composite material of the Comparative Example, carbon fibers which are arranged while keeping the linearity are greatly less than the case of the composite material of the Example. In the composite material of the Comparative Example, the higher strength based on the properties of the carbon fiber bundle is not exhibited. Even though a prepreg has employed the composite material of the Comparative Example, it is difficult to further enhance the strength of the prepreg.

5. Modified Example

The present invention is not limited to the above described embodiment, and can be appropriately modified within the scope of the present invention.

When the load acting between the composite material and the inspection needle is measured, the composite material and the inspection needle may be moved relatively to each other at a speed of 300 mm/min, and the support stand to be used is not limited in particular. A support stand can be used on which the composite material is fixed and the inspection needle can move, or a support stand can be used on which the composite material and the inspection needle can move in opposite directions to each other.

The load acting between the composite material and the inspection needle can be measured by an arbitrary method, and for example, a spring balance can be used.

REFERENCE SIGNS LIST 10 composite material
12 carbon fiber bundle
12a carbon fiber
14a carbon nanotube (CNT)

The invention claimed is:

1. A method for producing a composite material, comprising:
    immersing a carbon fiber bundle, including continuous carbon fibers, in a dispersion in which carbon nanotubes are dispersed in water, alcohol, or organic solvent;
    applying a tensile force to the carbon fibers, which are linearly arranged, using flat rollers;
    moving the carbon fibers linearly, under the tensile force by the flat rollers, at a constant depth inside the dispersion at a traveling speed of 1 to 20 m/min, such that the carbon nanotubes in the dispersion are adhered to respective surfaces of the carbon fibers; and
    applying a sizing agent to cover at least a part of the respective surfaces.

2. The method according to claim 1, wherein in the immersing of the carbon fiber bundle,
    the carbon fiber bundle has a shape of a strip in which 3 to 30 fibers of the carbon fibers are piled in a thickness direction.

* * * * *